United States Patent [19]

Sano et al.

[11] Patent Number: 4,763,348
[45] Date of Patent: Aug. 9, 1988

[54] CONTROLLED POWER SUPPLY FOR KEY TELEPHONE SYSTEM

[75] Inventors: Yoichiro Sano, Tokyo; Teruo Matsufuji, Koganei; Akira Sato, Fujisawa, all of Japan

[73] Assignee: Iwatsu Electric Co., Ltd., Tokyo, Japan

[21] Appl. No.: 853,225

[22] Filed: Apr. 17, 1986

[30] Foreign Application Priority Data

Apr. 30, 1985 [JP] Japan ................... 60-93089

[51] Int. Cl.$^4$ .................... H04M 1/64; H04M 19/00
[52] U.S. Cl. .................... 379/165; 379/157; 379/413
[58] Field of Search ............... 379/164, 165, 156, 166, 379/159, 160, 161, 413, 157

[56] References Cited

U.S. PATENT DOCUMENTS 4,653,088 3/1987 Budd et al. ................... 379/165

FOREIGN PATENT DOCUMENTS 56-39673 4/1981 Japan .
58-159055 9/1983 Japan ................... 379/413
59-51648 3/1984 Japan .

Primary Examiner—Thomas W. Brown
Attorney, Agent, or Firm—Emmanuel J. Lobato; Robert E. Burns

[57] ABSTRACT

A key telephone system provided with a power supply for supplying power to a specified key telephone set at all times and a controlled power supply capable of turning ON and OFF the power supply to controlled key telephone sets other than the specified key telephone set. The controlled power supply has provision for being automatically turned ON and OFF in accordance with a predetermined schedule or turned ON and OFF under control of the specified set. The power supply is turned ON upon receiving an incoming call or turned OFF upon ON - hooking of the key telephone set after a talking operation with a calling party or automatically turned ON and OFF in response to a specified dial signal incoming after automatically answering the incoming call. The key telephone system can have provision for individually controlling the power supply to each controlled key telephone set.

2 Claims, 6 Drawing Sheets

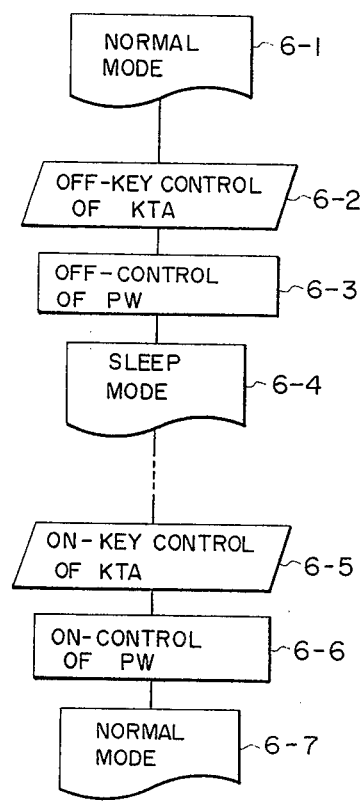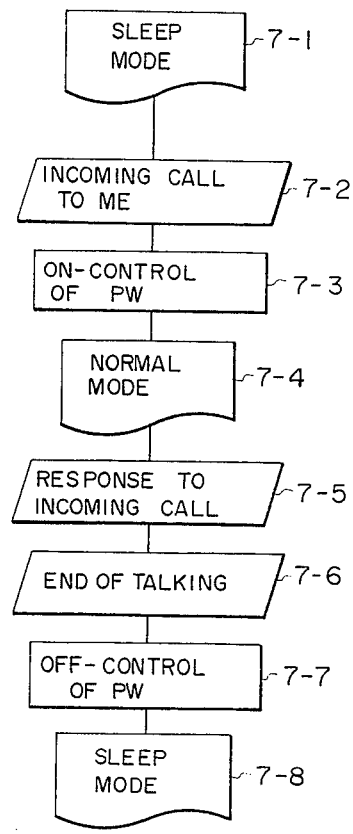

CONTROLLED POWER SUPPLY FOR KEY TELEPHONE SYSTEM

BACKGROUND OF THE INVENTION

The present invention relates to a key telephone system, and more particularly to a power supply circuit from a key service unit to key telephone sets.

As will be described below, conventional power supply circuits of the type were incapable of suspending the power supply to a specified key telephone set, and hence have a defect of wasteful power consumption.

SUMMARY OF THE INVENTION

An object of the present invention is to provide a key telephone system which has a power switch in its power supply circuit whereby when a key telephone set is not used, its power switch is turned OFF to stop the power supply thereto and when the telephone set is used, the power switch is turned ON to start the power supply thereto.

To attain the above object of the present invention, there is proposed a key telephone system, characterized by the provision of a specified power supply means for supplying power to a specified key telephone set at all times, and a controlled power supply means capable of turning ON and OFF the power supply to controlled key telephone sets other than the specified one.

In the key telephone system of the present invention, the controlled power supply means may be so arranged as to be automatically turned ON and OFF in accordance with a predetermined time schedule, or to be turned ON and OFF under control of the specified key telephone set, or to be turned ON upon receiving an incoming call, or to be turned OFF upon ON-hooking of the key telephone set after a talking operation with a calling party, or to be automatically turned ON and OFF in response to a specified dial signal incoming after automatically answering an incoming call, or to be capable of individually controlling the power supply to each controlled key telephone set.

BRIEF DESCRIPTION OF THE DRAWINGS

The present invention will be described in detail below in comparison with conventional art with reference to the accompanying drawings, in which:

FIGS. 5, 6, 7 and 8 flowcharts explanatory of examples of operation of the embodiments of the present invention.

DETAILED DESCRIPTION

To make differences between the present invention and conventional art clear, examples of conventional art will first be described.

Figure 1:
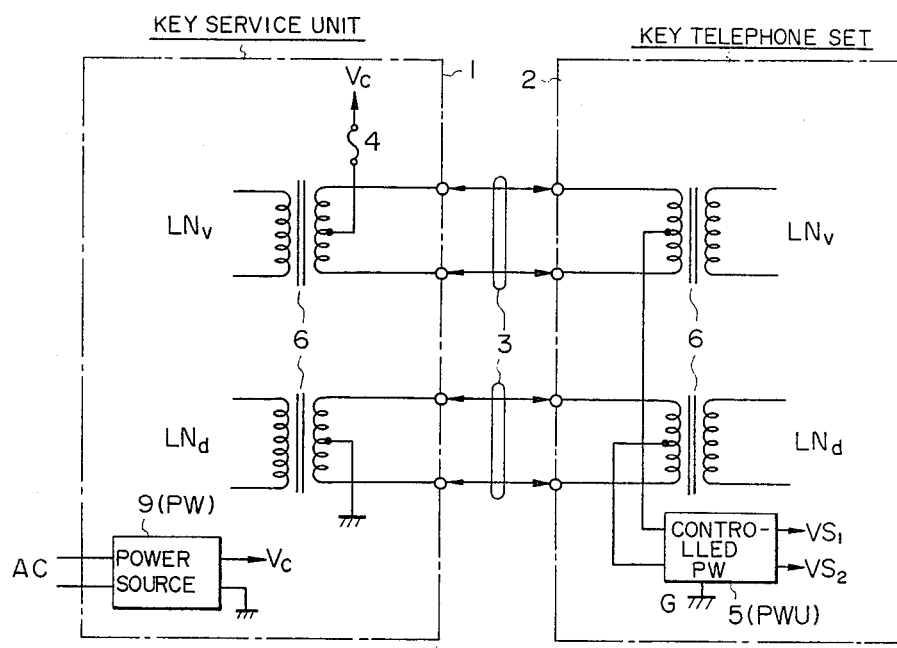
FIGS. 1 and 2 are circuit diagrams illustrating examples of a power supply circuit used in conventional key telephone system.
Figure 2:
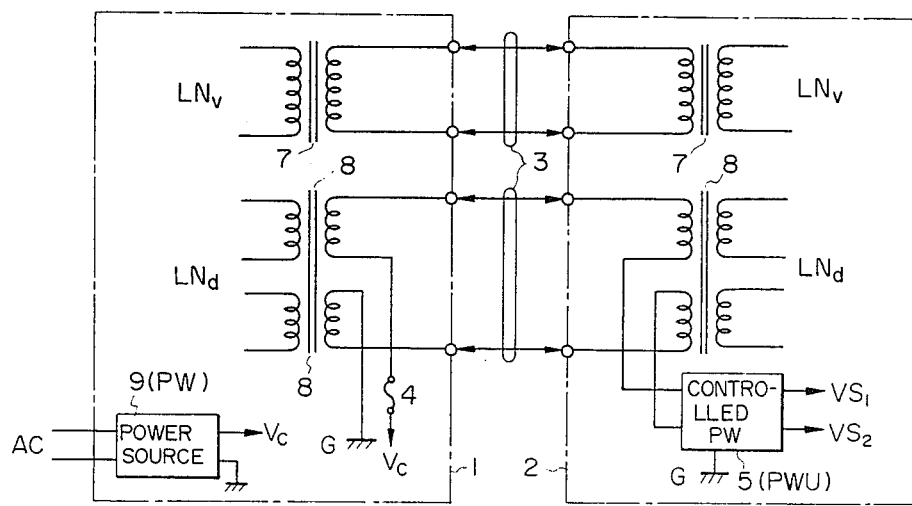

A conventional power supply circuit for a key telephone set (disclosed in "IWATSU TECHNICAL JOURNAL", vol. 22, No. 2, Mar. 15, 1984.) has such an arrangement as shown in FIG. 1 or 2.

In FIGS. 1 and 2, reference numeral 1 indicates a part of the circuit of a key service unit, 2 a part of the circuit of a key telephone set, 3 distribution cables, 4 a protecting fuse, 5 a power source unit (PWU), 6 in FIG. 1 a center-tapped transformer, 7 in FIG. 2 a normal transformer, 8 a two-winding transformer and 9 a power source unit PW for deriving DC power Vc from a commerical power supply AC of 100 volts.

In FIG. 1, the key service unit 1 and the key telephone set 2 have their voice lines LNv and data lines LNd interconnected via a four-wire balanced circuit using the center-tapped transformers 6.

The power Vc is supplied via the distribution cables 3 of the voice lines LNv to the power source unit PWU of the key telephone set 2 while being grounded via the distribution cables 3 of the data lines LNd, as indicated by G. The power source unit PWU in the key telephone set 2 provides required power supplies $VS_1$ and $VS_2$.

In FIG. 2, the voice lines LNv are interconnected via a balanced circuit using the normal transformers 7, and the data lines LNd are interconnected via a balanced circuit using the two-winding transformers 8. The power Vc is supplied by being superimposed on the data lines LNd, and the required power supplies $VS_1$ and $VS_2$ are obtained from the power source unit PWU in the key telephone set 2.

As will be seen from the above, the conventional power supply circuit is incapable of suspending the power supply to a specified key telephone set, and hence has a defect of wasteful power consumption.

The present invention will hereinafter be described below.

Figure 3:
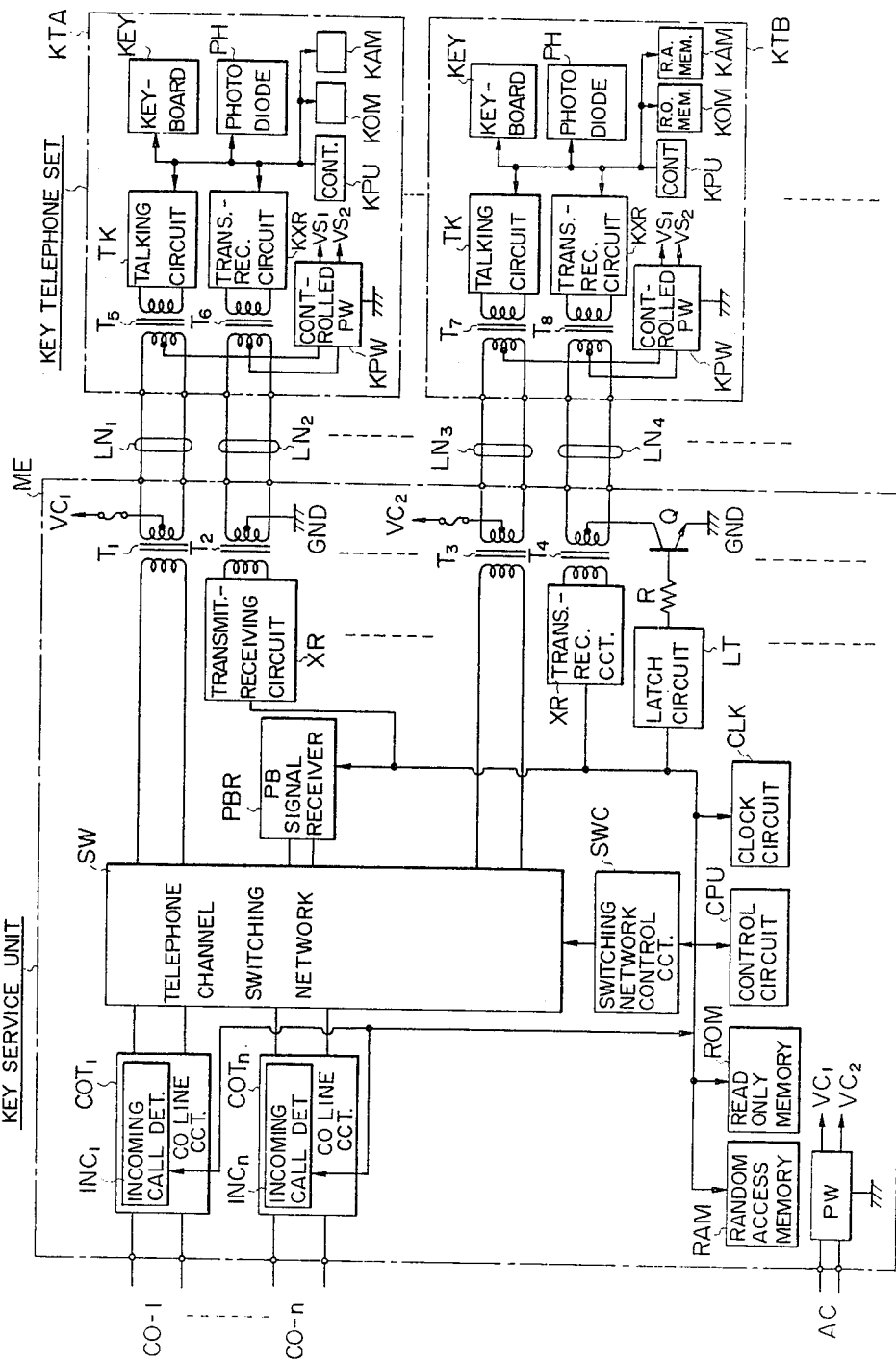
FIGS. 3 and 4 are circuit diagrams illustrating embodiments of the present invention.

FIG. 3 is a block diagram of the entire key telephone system including the power supply circuit which employs center-tapped transformers according to an embodiment of the present invention. Reference character ME indicates a key service unit; AC the commercial power source; PW a power source unit for providing $VC_1$ and $VC_2$; CO-1, ... Co-n CO lines; KTA a specified key telephone set; KTB a key telephone set, which power supply is ON-OFF controlled; $LN_1$, $LN_2$, $LN_3$ and $LN_4$ cables for connecting the key service unit ME and the key telephone sets KTA and KTB; and KPW a power source unit which is employed as a controlled power supply in a key telephone set to obtain a predetermined power source voltage by the use of suitable means, such as a switching regulator. In this case, the normal state in which all the key telephone sets KTA and KTB are operating will be referred to as the normal mode and the state in which only the key telephone set KTA is operating will be referred to as the sleep mode. In the normal mode a control circuit CPU of the key service unit ME is operating under control of a program of a read only memory ROM, while control circuits KPU of the key telephone sets KTA and KTB are each operating under control of a program of a read only memory KOM. The power supply from the key service unit ME to the key telephone sets KTA and KTB takes place via a route [$VC_1$ of ME→$T_1$→$LN_1$→$T_5$ of KTA→KPW→$T_6$→$LN_2$→$T_2$ of ME→GND] in the key telephone set KTA and via a route [$VC_2$ of ME→$T_3$→$LN_3$→$T_7$ of KTA→KPW→$T_8$→$LN_4$→$T_4$ of ME→Q→GND] in the key telephone set KTB. In the above, reference Q is a power switch, which is, in the normal mode, supplied with a high level H from a latch circuit LT via a resistor R and hence is in the ON state.

The control circuit CPU in the key service unit ME performs ON-OFF control of the power switch Q, so that the following operations can be effected.

Figure 5:
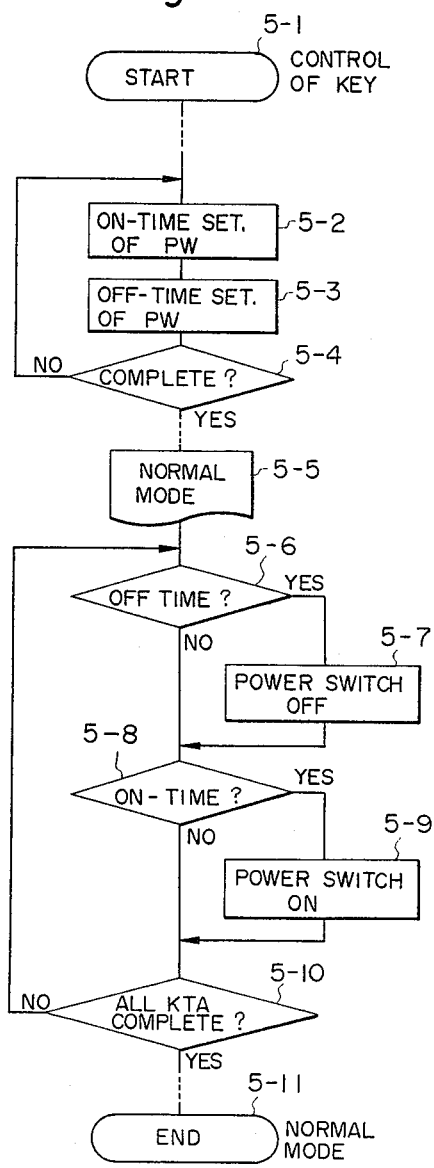

(1) In case of controlling the turning ON and OFF of all the key telephone sets in accordance with a preset time schedule:

The ON time and the OFF time of the power switch Q corresponding to each key telephone set KTB are stored in a random access memory RAM of the key service unit ME through operation of a keyboard KEY of the key telephone set KTA. Now, the route of information in this case will be described. The control circuit KPU of the key telephone set KTA identifies time information in response to a change in the information from the keyboard KEY and transmits the time information from a transmitting-receiving circuit KXR to the key service unit ME. It is also possible, in this instance, that the information from the keyboard KEY be temporarily stored in a random access memory KAM and sent out therefrom at a time. In the key service unit ME the control circuit CPU receives information from a transmitting-receiving circuit XR corresponding to the key telephone set KTA and stores it in a random access memory RAM. In the normal mode, the control circuit CPU compares time information of a clock circuit CLK with the OFF time read out of the random access memory RAM and, in the case of coincidence therebetween, sets a low level L in the latch circuit LT. By this operation, the power switch Q in turned OFF, and the power supply to the key telephonse set KTB is stopped. At the ON time, the control circuit CPU sets a high level H in the latch circuit LT to turn ON the power switch Q, initiating the power supply to the key telephone set KTB. The flow of this processing is depicted in FIG. 5, including the following steps:

5-1: "START" by control of the key:
5-2: ON-TIME SETTING OF PW
5-3: OFF-TIME SETTING OF PW
5-4: COMPLETE?
5-5: NORMAL MODE
5-6: OFF-TIME?
5-7: POWER SWITCH OFF
5-8: ON-TIME?
5-9: POWER SWITCH ON
5-10: ALL KTA COMPLETE?
5-11: END (NORMAL MODE)

(2) In case of turning ON and OFF the power of all other key telephone sets under control of a specified key telephone set:

The power switches Q of all the key telephone sets KTB are turned OFF by operating the keyboard KEY of the key telephone set KTA, providing the sleep mode. After a predetermined elapsed time, the power switches Q of all the key telephone sets KTB are turned ON by operating the keyboard KEY of the key telephone set KTA, turning the sleep mode to the normal mode. The route of information in this case will be described. The control circuit KPU of the key telephone set KTA identifies the OFF information of the power switch Q in response to a change in the information from the keyboard KEY and transmits the OFF information via the transmitting-receiving circuit KXR to the key service unit ME. In the key service unit ME the control circuit CPU receives the OFF information via the transmitting-receiving circuit XR corresponding to the key telephone set KTA and then sets the low level L in the latch circuit LT. Thus, the power switches Q are turned OFF, stopping the power supply to the key telephone sets KTB.

Next, the control circuit CPU receives, from the transmitting-receiving circuit XR corresponding to the key telephone set KTA, the ON information delivered via the same route as in the above and then sets the high level H in the latch circuit LT. By the above operation, the power switch Q is turned ON, starting the power supply to the key telephonse set KTB. The flow of this processing is shown in FIG. 6, including the following steps:

6-1: NORMAL MODE
6-2: OFF-KEY CONTROL OF KTA
6-3: OFF-CONTROL OF PW
6-4: SLEEP MODE
6-5: ON-KEY CONTROL OF KTA
6-6: ON-CONTROL OF PW
6-7: NORMAL MODE (3) In case of turning ON the power of a key telephone set in response to an incoming call thereto and turning OFF the power upon ON-hooking of the key telephone set:

Upon occurrence of an incoming call to the key service unit ME in the sleep mode, the power switch Q is turned ON, providing the normal mode. The key telephone set KTA or KTB answers the incoming call and upon ON-hooking after communication, the power switch Q is turned OFF, and the key telephone set KTB returns to the sleep mode.

The route of information in this case will be described. In the case of an incoming call to the CO line CO-1, the control circuit CPU receives incoming call information from an incoming call detector $INC_1$ of a CO line circuit $COT_1$ and sets the high level H in the latch circuit LT. By this operation, the power switch Q is turned ON, initiating the power supply to the key telephone set KTB.

Upon ON-hooking of the called key telephone set KTA of KTB, its control circuit KPU identifies ON-hooking information in response to a change in the information from the keyboard ME and sends it from the transmitting-receiving circuit KXR and the key service unit ME. In the key service unit ME, the control circuit CPU receives the ON-hooking information via the transmitting-receiving circuit XR corresponding to the called key telephone set KTA or KTB, and then sets the lower level L in the latch circuit LT. By this operation, the power switch Q is turned OFF, stopping the power supply to the key telephone set KTB. The flow of this processing is shown in FIG. 7, including the following steps:

7-1: SLEEP MODE
7-2: INCOMING CALL TO ME
7-3: ON-CONTROL OF PW
7-4: NORMAL MODE
7-5: RESPONSE TO INCOMING CALL
7-6: END OF TALKING
7-7: OFF-CONTROL OF PW
7-8: SLEEP MODE (4) In case of turning ON and OFF key telephone sets by a specified dial signal incoming after automatically answering an incoming call:

When the subscriber calls the key service unit from the outside network, for instance, when the call is received by the CO line CO-1, the CO line circuit $COT_i$ automatically answers by a predetermined function and then connects the CO line CO-1 to a PB signal receiver PBR. Furthermore, in a case where it is desired to perform a special function, for example, in a case where the subscriber wants to hear at a remote place a message recorded during his absence, upon receiving of a specified dial signal (a voice frequency signal, for example) known by only the subscriber, the PB signal receiver PBR identifies the specified dial signal, by which the power switch Q is turned OFF, turning it in the sleep mode. During the sleep mode services by this special function can be received by the subscriber. After a predetermined elapsed time, the subscriber performs the same dialing operation as that for calling, thereby turning ON the power switch Q to return to the normal mode.

The route of information in this instance will be described. When the control circuit CPU of the key service unit ME receives incoming call information from the incoming call detector $INC_1$ of the CO line circuit $COT_1$, the control circuit CPU causes the CO line circuit $COT_1$ to establish a loop including the CO line and, futher, controls a speech network control circuit SWC and a speech network SW to connect the CO line circuit $COT_1$ to the PB signal receiver PBR. Upon receiving specified dial information from the subscriber, the PB signal receiver PBR transmits OFF information to the control circuit CPU, which sets the low level L in the latch circuit LT. In consequence, the power switch Q is turned OFF, stopping the power supply to the key telephone set KTB.

Figure 8:
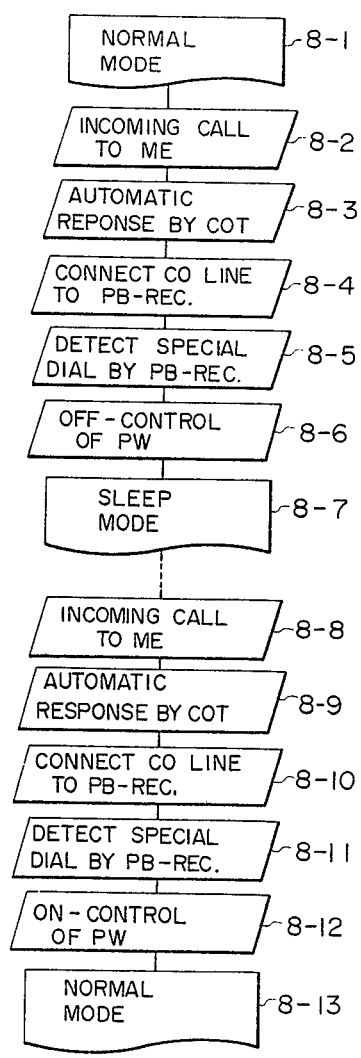

Moreover, the control circuit CPU receives ON information from the PB signal receiver PBR via the same route as in the above and sets the high level H in the latch circuit LT. As a result of this operation, the power switch Q is turned ON, starting the power supply to the key telephone sets KTB. The flow of this processing is depicted in FIG. 8, including the following steps:

8-1: NORMAL MODE
8-2: INCOMING CALL TO ME
8-3: AUTOMATIC RESPONSE BY COT
8-4: CONNECT CO LINE TO PBR
8-5: DETECT SPECIAL DIAL BY PBR
8-6: OFF-CONTROL OF PW
8-7: SLEEP MODE
8-8: INCOMING CALL T0 ME
8-9: AUTOMATIC RESPONSE BY COT
8-10: CONNECT TO LINE TO PBR
8-11: DETECT SPECIAL DIAL BY PBR
8-12: ON-CONTROL OF PW
8-13: NORMAL MODE

The operation (4) described above produces a specified effect that only the subscriber who knows the specified dial can call to the key telephone set.

Figure 4:
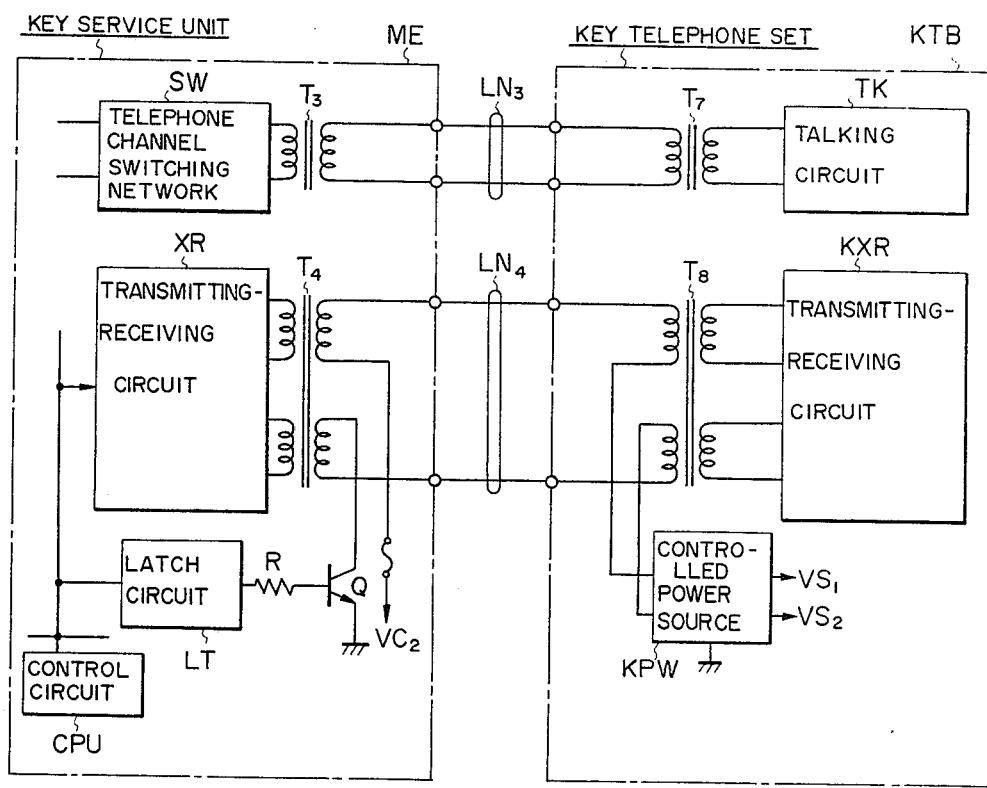

FIG. 4 illustrates the principal part of another embodiment of the power supply circuit of the present invention which employs two-winding transformers. This embodiment is identical with the embodiment of FIG. 3 in the operation signals used, the control methods and the omitted parts. When the control circuit CPU sets the high level H in the latch circuit LT, the power switch Q is turned ON to start the power supply to the key telephone set KTB, and when the low level L is set in the latch circuit LT, the power switch Q is turned OFF, stopping the power supply to the key telephone set KTB.

While FIGS. 3 and 4 each illustrate a start system in which one key telephone set is connected to one power supply circuit, the present invention is also applicable to a branch system in which two or more key telephone sets are connected to one power supply circuit. Furthermore, the speech network SW can be used either with a space division system or with a time division system.

Besides, it is possible not only to place all the other key telephone sets other than the specified key telephone set KTA in controlled telephone sets, as described above, but also to place desired ones of the abovesaid other key telephone sets in controlled key telephone sets. In addition, it is also possible to change the classification of the controlled key telephone sets with respect to functions, such as a general call and a party call, and to individually control them.

As described above in detail, in accordance with the present invention, the power supply to key telephone sets which are not used is stopped by turning ON and OFF the power switch, thereby reducing the power consumption of the key telephone system.

What we claim is:

1. A key telephone system having key telephone sets comprising, specified power supply means for supplying power to a specified key telephone set at all times, controlled power supply means capable of turning ON and OFF power supply to controlled key telephone sets other than the specified one, said controlled power supply means comprising means for automatically turning the power supply means ON in response to a specified dial signal incoming call and OFF after automatically answering the incoming call.

2. A key telephone system according to claim 1, in which the controlled power supply means comprises means for individually controlling power supply to each controlled key telephone set.

* * * * *